United States Patent Office 3,565,675
Patented Feb. 23, 1971

3,565,675
COATINGS FROM LITHIUM SILICATE
Robert H. Sams, Aldan, Pa., assignor to Philadelphia Quartz Company, Philadelphia, Pa., a corporation of Pennsylvania
No Drawing. Filed Oct. 5, 1966, Ser. No. 584,374
Int. Cl. C04b *41/00*
U.S. Cl. 117—123                                 12 Claims

ABSTRACT OF THE DISCLOSURE

Siliceous films are developed on hydroxylated surfaces by heating them in contact with a solution of lithium silicate.

---

This invention relates to the development of siliceous coatings on substrates while in contact with an aqueous solution of lithium silicate. These films usually form on a surface having hydroxyl groups with which the silica micelle or silicate ion can react and no drying operation is required. While this reaction will occur at about 60° C., it is much faster at temperatures of about 85° C. up to the boiling point and occurs most readily with solutions having a mol ratio of about 2 $SiO_2$:1 $Li_2O$, although films may be formed over the range of ratios of 1.3 $SiO_2$:1 $Li_2O$ to about 12 $SiO_2$:1 $Li_2O$.

It has long been known to use alkali metal silicate solutions for treating and otherwise coating inorganic and organic surfaces either with a silicate solution alone or as a binder for a complex composition. Similarly, colloidal silica systems have so been used, but previously it has not been recognized that such surfaces in contact with lithium silicate solutions having significant concentrations above about 1000 parts per million of $SiO_2$ will develop an adherent siliceous surface film without drying which will resist removal by ordinary washing and scrubbing and will affect usefully the optical and other characteristics of the surface such as hardness, color, reflectivity, opacity, smoothness, porosity, conductivity and reactivity.

In general this added film is predominantly $SiO_2$. It is believed that it forms by reaction with hydroxyl groups at the substrate surface. These are present on siliceous surfaces; metals which readily develop an oxide surface also have available hydroxyl groups as do cellulosic and other organic surfaces.

LITHIUM SILICATE PROPERTIES

It is well known that the lithium ion is much smaller and has a much greater charge density than the other alkali metal ions. Consequently it is highly hydrated and the size of the hydrated ion is actually greater than that of the other common alkali metal ions. Thus the lithium ion stabilizes colloidal silica at much higher $SiO_2$:$Li_2O$ ratios than the other alkali metals. For instance, it forms stable solutions or sols at ratios above 20 $SiO_2$:1 $Li_2O$. However, at the metasilicate and disilicate ratios it is much less stable than the sodium or potassium silicate for instance since an insoluble precipitate will form on heating merely to about 48° C.

The lithium silicate solutions vary in properties in other ways from the ordinary alkali metal silicate solutions. At mole ratios lower than about 3.5 $SiO_2$:$Li_2O$, lithium silicate solutions have a higher pH than the sodium silicate solutions of a comparable molecular ratio. However, above this ratio the other alkali metal silicate solutions tend to be higher in pH and become proportionately higher as the ratio increases. Also the pH of the lithium silicate solution remains constant as the concentration increases if the $SiO_2$ content exceeds about 8% for the 2 mole ratio or about 3% for the 5 mole ratio $SiO_2$:$Li_2O$.

For similar ratios and similar solids contents lithium silicate solutions have a higher viscosity than those of sodium silicate solutions. At 40% solids sodium silicate solutions begin to exhibit a minimum viscosity value at 1.8–2 $SiO_2$:$Na_2O$ ratios. This increases to a sharp minimum at about 46% solids. On the other hand, lithium silicate solutions show a maximum viscosity value. Thus for a ratio of 4.8 $SiO_2$:$Li_2O$ the maximum occurs at a solids content of about 15% and reaches a fairly sharp maximum at about 23% solids. The stability of lithium silicate solutions is also different from that of the sodium silicate as might be inferred by the viscosity differences.

Sodium silicate solutions are more stable and can be concentrated to higher silica concentrations at $SiO_2$:$Na_2O$ ratios below about 4, while lithium silicate solutions are more stable and can be concentrated to higher silica concentrations at higher $SiO_2$:$Li_2O$ ratios than at lower ones. Lithium silicate solutions at a 5 mole ratio or greater are stable at 20% $SiO_2$ concentration, but are unstable at a 2 mole ratio, even at lower concentrations. In the latter a voluminous white precipitate begins to form in about one month at concentrations of about 20% $SiO_2$. This precipitate is insoluble in water and has a mole ratio of about 2.

On heating without evaporation a copious white precipitate forms in a 2 mole ratio lithium silicate solution at about 48° C. This precipitate also has a mole ratio of 2 and exhibits no birefringence on microscopic examination. However, it is soluble in water upon cooling if it is not heated after precipitation. Higher ratio lithium silicate solutions of a mole ratio of 5 or more can be heated at about 75° C. for long periods of time with no apparent change in the solutions. However, when heated above about 80° C., the higher ratio solutions form gels which will redissolve on cooling if they are not overheated. All sodium silicate solutions in the mole ratio range in which they can be prepared, that is, below about 4 to 4.5, are stable even on boiling if dehydration is prevented.

Drying tests on films of lithium silicate solutions show that the higher ratio solutions dry more quickly than the lower ratio ones. The 7.5 and 5 mole ratio materials attain a constant weight after one day of drying at room temperature. These dry films contain about 10% and 17% of residual water respectively. The 2 mole ratio solution did not give a constant weight after two days of drying at room temperature and appeared to be reacting with the $CO_2$ in the air. At 100° C. solutions at 2, 5 and 7.5 mole ratios lose almost all of the water from the original coating. Only about 5% water remains in the film. The 7.5 mole ratio solutions take about 2.5 hours to dry while the 5 mole ratio solution requires about 4 hours at 100° C. The 2 mole ratio solution dries even more slowly and loses 95% of the water originally present in about five hours. This behavior is similar to that of sodium and potassium silicates. However, the dry films prepared from lithium silicate solutions do not adhere to smooth surfaces such as glass or metal, and are not continuous, while films formed from sodium and potassium silicate solutions adhere to such surfaces and appear to be continuous. The film-forming properties of these lithium silicate solutions resemble those of silica sols which do not form adhesive or continuous films.

It is also known that dilute solutions of sodium or potassium silicate at concentrations usually of about 100 parts per million $SiO_2$ or lower may be used to form films on metals which films will tend to prevent or retard corrosion of the metal. Such films, however, do not form readily at a pH above about 8 or 8.5. At a pH in this range or higher the film is decomposed by the alkaline solution.

While lithium silicate solutions differ from the other alkali metal silicate solutions, they also differ from silica sols. The silica present in a silica sol is found to be completely colloidal. A lithium silicate of a mole ratio of $2SiO_2:Li_2O$ contains only crystalloidal silica. At a somewhat higher ratio of 5, the lithium silicate solution may have as much as 32% colloidal silica present, and at 7.5 ratio there may be 68% silica present as colloidal silica. Thus any similarity to the silica sols will be only at the higher ratios of silica to lithium oxide. Under conditions by which a coating is applied by use of the lithium silicate solution, no coating is obtained with either a colloidal silica sol or a sodium or potassium silicate solution. However, mixtures of lithium silicate solutions with either the sodium, potassium or organic alkali silicates or a silica sol can be used to obtain a coating just as with the lithium silicate alone. These mixtures may be prepared by any known method.

THE SUBSTRATE

I have treated a wide variety of surfaces such as ordinary siliceous glass, porcelain, metals, such as iron, stainless steel and aluminum, rubber, resins or plastic surfaces such a nylon, polyester and vinyl, and wood or other cellulosic surfaces. These all are thought to have in common the property of forming hydrous surface films by adsorption of water to oxide or hydroxide atoms at the exposed areas of the base matter.

My procedure for coating substrates makes possible a wide variety of surface characteristics. The coating applied may vary from a transparently thin coating to one which is opaque to light. The film may be transparent and colorless to transmitted light but colored in reflected light. It may have a faintly hazy blue tinge or vary through yellow to a nearly opaque white. The surface coating may be smooth and scarcely noticeable or it may be heavy and resistant to slippage.

THE LIMITING PARAMETERS

The development of a coating is related to the ratio of silica to lithium oxide in the solution as well as the concentration of silica, the temperature of the solution and the time of exposure. While I prefer to use a ratio of $2 SiO_2:1 Li_2O$ because of the ease of forming satisfactory films, I have found that at a ratio of 1:1, glass is removed from the surface rather than building up a film of $SiO_2$ from the solution. However, with high enough temperatures and long enough times films will be deposited from solutions having as low a ratio as $1.5 SiO_2:1 Li_2O$, and also as high a ratio as $10.7 SiO_2:1 Li_2O$. While I prefer a concentration of $SiO_2$ from about 5 to 15% $SiO_2$, useful films may be formed with a range of about 1.00% to 30% $SiO_2$. While under the best conditions no film formed at room temperature after the course of 7 days, a useful film was formed in about 5 seconds at 95° C., and temperatures from about 60° C. to 165° C. or higher may form useful films. Under the best of conditions a time of five seconds may form a film which will have increased transmission with reduced reflection whereas continuing reaction at a high temperature such as 165° C. for 16 hours will form a heavy, opaque layer.

Thus, while I may use a range of 1 to $10.7 SiO_2:1 Li_2O$, I prefer a range of 1.5 to $2.5 SiO_2:1 Li_2O$, and especially prefer the ratio of $2 SiO_2:1 Li_2O$.

Any of the known methods for preparing lithium silicate solutions are satisfactory. These may involve the well-known reaction of lithium hydroxide with colloidal silica sols or silica gel, or the interaction with another alkali metal or organic alkali silicate.

If desirable, a surfactant may be added to aid the solution in treating a soiled or difficultly wettable surface. A silicone cleaner may be employed to clean a surface prior to treatment, the residual silicone film having been found not to interfere with subsequent treatment by a lithium silicate solution. The presence of materials such as starch, dextrin or glycerine in the treating solution seems to have no deleterious effect, and may aid in a coating application of the solution by changing its flow characteristics. Likewise sodium or potassium or organic ammonium silicate solutions may be mixed with the lithium silicate without affecting the finish which may be obtained.

A $2 SiO_2:1 Na_2O$ solution without lithium content formed no finish when treated from one to sixteen hours at 95° C. A $4.1 SiO_2:1 Na_2O$ solution with 12.5% $SiO_2$ left no surface finish after one hour at 95° C. or after 16 hours at 165° C. Aged solutions of this stock were not satisfactory. No films were obtained either with silica sol or with potassium silicate even at 16 hours at 165° C.

Example 1

A lithium silicate having a ratio of $2 SiO_2:1 Li_2O$ with 12.5% of $SiO_2$ was prepared by diluting and causticizing a lithium silicate solution initially of higher $SiO_2:Li_2O$ ratio and silica concentration. This had been manufactured by deionizing a solution of sodium silicate with base exchange resin and dissolving lithium hydroxide therein and finally concentrating the solution. The original solution contained 20.32% of $SiO_2$ and 3.27% of $Li_2O$ and required the addition of lithium hydroxide to form the disilicate ratio solution.

Glass micro-slides #7036–A from Arthur H. Thomas Co. were used as test surfaces. A new glass slide was dipped in the solution so that the surface was wet with the lithium silicate. The wet slides coated with the lithium silicate solution were then dipped in 95° C. mineral oil for periods ranging from 5 seconds to 5 minutes. After the specified time the slides were removed and scrubbed with a bristle brush and warm water and wiped dry.

For longer periods slides were immersed in a container of the same solution and the container was then placed in an oil bath at 95° C. for 16 hours. After this exposure the slides were removed, scrubbed and dried as before. After only 5 seconds the slides were as transparent, colorless and glossy as when new. Those treated for 10 and 15 seconds were transparent and colorless in viewing transmitted light, but appeared colored when viewed as light reflectors. Those treated from 30 to 60 seconds had a hazy blue color and after 2 minutes the slides had a hazy yellow coating. After 5 minutes the coating was opalescent, and after 16 hours, the coating was opaque white. The slide treated for 30 seconds was weighed and showed no detectable weight change whereas the slide treated for 5 minute gained 0.00003 g./sq. cm. The slides treated above were compared with an untreated slide for percent of transmitted light using a Brice-Phoenix light scattering photometer model 25, and percent reflected light using a Gardner portable 60° gloss meter relative to an untreated glass slide.

| Slide | Percent transmitted | Percent reflected |
|---|---|---|
| Untreated, calibrated to | 100 | 100 |
| 5 seconds | 100 | 100 |
| 10 seconds | 101 | 98 |
| 15 seconds | 100.5 | 94 |
| 30 seconds | 98 | 65 |
| 1 minute | 88.5 | 58 |
| 2 minutes | 86.5 | 53 |
| 5 minutes | 81 | 48 |
| 16 hours | 13.5 | 5 |

The coated glass slides were subjected to a number of tests. It will be noted in the table above that the slide formed at 10 seconds and the one formed at 15 seconds both transmitted more light than the untreated or uncoated slide while the reflected light was somewhat reduced. The slide treated for 30 seconds transmitted almost as much light as the untreated slide and reflected only 65% of incident light. After 16 hours there was a very heavy coating and only 5% of incident light was reflected. The slip resistance of this latter slide was tested in comparison with an untreated glass slide. Thus when one untreated slide was allowed to rest on another fastened to a tilting board, slipping occurred at an angle of about 11°. When the slides treated at 16 hours were tested for slipping one on another, slipping occurred at an angle of approximately 39°.

The slides treated 16 hours were also readily marked with a ball point pen or an ordinary carbon pencil.

Fountain pen ink feathered and could not be wiped cleanly from a slide treated 16 hours, but the slide treated only 30 seconds gave a sharp ink line which could be wiped cleanly from the surface.

A pressure sensitive vinyl tape was pressed into firm contact over a bond area of 0.75 of a square inch. The force necessary to separate the tape from the untreated glass was about 4.3 pounds whereas the force necessary to separate the tape from the glass treated for 16 hours was about 7.1 pounds.

The coating on the slide treated for 16 hours was also found to be useful as a base for chromatographic determinations. For instance, the migration and separation of a polyphosphate could be followed.

A fritted glass filter disk was immersed in the solution and held at 95° C. in an oil bath for 16 hours. The filter disk was then removed and scrubbed and dried. Whereas an untreated size 30–F filter AHT Co. #4141–C permitted sufficient air leakage to support 8 inches of mercury, the disk treated for 16 hours supported 12.5 inches of mercury.

Example 2

In this series of tests lithium silicate solution was placed in a test tube, a section of glass rod was inserted, and a layer of mineral oil placed on the top. The test tube was then lowered into a 95° C. oil bath for from 1 to 16 hours after which the glass rod was removed, scrubbed and dried, and examined in reflected light alongside an untreated rod. Solutions in a test tube containing a section of glass rod were also heated with saturated steam by enclosing them with water in a sealed container which was then heated to 165° C.

When the lithium silicate solution had a ratio of 2 $SiO_2$:1 $Li_2O$, and a concentration of 12.5% $SiO_2$, the glass rod had a translucent colored finish with a densely speckled white overlay following 1 or 16 hours at 95° C. or 16 hours at 165° C. However, there was no apparent change on treating for 7 days at room temperature. The glass rod was Arthur H. Thomas Co. #6090 flint glass.

An Arthur H. Thomas Co. #7036–A glass micro-slide coated with the same solution and immersed in an oil bath at 60° C. for 5 minutes had a transparent dark violet finish similar to that which appeared after a few seconds in a 95° bath. In each case the slide was scrubbed and dried before testing.

When a disilicate solution having a concentration of 19.3% $SiO_2$ was used, a similar glass slide immersed at 95° C. in oil for 5 minutes, then scrubbed and dried, retained a transparent violet finish, but had no detectable weight change. A similar glass rod was tested in a disilicate solution containing 1.75% $SiO_2$ and had a transparent finish after 16 hours at 95° C., but none after one hour. At 1% $SiO_2$, there was no apparent finish after even 16 hours at 95°, but a slightly variegated colored finish after 16 hours at 165° C. Thus dilute solutions require very long times to effect a noticeable treatment.

Example 3

The effect of the treatment of glass rods in lithium silicate solutions having different ratios was determined. A mole ratio of 3 $SiO_2$:1 $Li_2O$ at 12.5% $SiO_2$ left a crackled white finish with no color underneath after 16 hours at 95° C., but no change was apparent after 1 hour at 95° C. At a ratio of 4 $SiO_2$:1 $Li_2O$, a variegated colored finish appeared after 16 hours at 95° C., but a 5:1 ratio left no apparent finish after 16 hours at 95° C. However, after 16 hours at 165° C. there was a smooth white dense coating, but no light refractive film beneath. At a ratio of 10.7 no change was observed after 16 hours at 95° C., but a smooth opalescent white overlay on a transparent violet finish was obtained after 16 hours at 165° C.

At a ratio of 1.5 $SiO_2$:1 $Li_2O$ and 12.5% $SiO_2$ there was a transparent colored finish after 1 hour at 95° and a mottled translucent overlay on a transparent variegated finish after 16 hours at 95° C.

At a 1:1 ratio and 5% $SiO_2$ there was no finish after 1 hour at 95° C., but a colorless striated glossy surface after 16 hours at 95° C., and an easily scratched white haze overlaying a mottled colored surface after 16 hours at 165° C. When #7036–A micro slides were similarly treated, it was found that the slide had lost weight at the rate of about 0.005 g./sq. cm. whereas in a lithium hydroxide solution having the same lithium oxide content the uniformly frosted surface had lost weight at the rate of about 0.006 g./sq. cm. and in sodium metasilicate solution at 5% $SiO_2$ lost weight at about 0.0015 g./sq. cm. The frosted surface of the lithium hydroxide treated slide was easily scratched whereas both the lithium and sodium silicate treated surfaces were harder.

Example 4

A lithium silicate having a mole ratio of 2.02 to 1 $Li_2O$ and 14.06% of $SiO_2$ was coated on a clean glass micro slide and then steamed until the coating turned white, after which the slide was washed off and dried. A bluish, transparent film was formed on the treated glass. In general when such films are heated a little beyond the point where they turn white, a transparent light-refractive film will remain after scrubbing and drying. If heated longer, a more opaque white film remains.

Example 5

When 10% glycerine was added to the disilicate solution of the above Example 4, a uniform finish was obtained on the glass slide after 25 seconds immersion in hot oil. However, the finish could be scratched with the finger nail, but after heating for a few seconds on a Bunsen burner flame the finish turned violet when heated and then came back to the original bluish shade on recooling and was scratch resistant. This color variation is reversible.

The addition of corn starch or dextrin or asbestos fiber also helped to hold the film in place until it reacted with the glass surface. With these additives the washed finish was scratch resistant.

Subsequent heating of the surface finish to a sufficiently high temperature caused it to fuse, and could be employed either to change the physical character of the finish itself or to modify the surface composition and character of the substrate.

Example 6

A disilicate solution containing 10.53% of $SiO_2$ and 2.6% of $Li_2O$ was used to coat a strip of rolled steel and a piece of stainless steel. In both cases the coating was heated at 95° in an oil bath for 16 hours and then scrubbed clean, leaving a bluish area where the coating had been placed. The partially coated samples of steel where then immersed in dilute HCl for two hours and washed and wiped dry. The bluish treated area was practically unchanged while the untreated area was tarnished.

A sample of stainless steel treated as above with a solution of 3.1% $Li_2O$ and 12.5% $SiO_2$, gained in weight and increased in peel resistance for a vinyl tape from 4.0 lbs. for the untreated metal to about 7 lbs. for the treated surface.

Example 7

An aluminum bar was coated with the same lithium silicate solution as in the first paragraph of the previous Example 6 and was immersed at 95° C. in an oil bath for 2 minutes, after which all possible of the coating was washed off with soap and water and the surface wiped dry. A bluish cast indicated that a thin film had remained on the aluminum. Even treatment for 30 seconds affected the aluminum surface as it remained shiny after the untreated section had become dulled by exposure to the atmosphere. Other metals may be similarly treated.

Example 8

Glazed and unglazed porcelain were treated by dipping in the same lithium silicate solution of the first paragraph of the previous Example 6 and immersed in a 95° C. oil bath for 2 minutes. The porcelain was then washed and dried. A faintly bluish continuous film was noted and pencil marks were darker on the untreated than on the treated areas. A coating was also placed on a birch tongue blade by similar treatment.

Example 9

Nylon and polyester film surfaces when treated as in the second paragraph of Example 6 left an observable residual film. The mark of a ball point pen could not be wiped off with a damp cloth as it could be from the untreated surface.

Example 10

A Pyrex test tube was filled with lithium disilicate solution at a concentration of 12.5% $SiO_2$. This was then dipped in a beaker of boiling water for one minute, cooled with a cold water jacket, and emptied and washed out. The inner tube wall retained an opalescent finish. The remainder of the lithium disilicate solution whitened by the heat treatment was poured into another Pyrex test tube and again dipped into the boiling water for one minute and cooled and washed out. The second tube also retained permanent film.

When a lithium disilicate solution containing about 15% $SiO_2$ is heated overnight at 60° C., the precipitate is entirely water soluble and has a mole ratio of approximately 1:2:4.5. The solids formed similarly by heating overnight at 95° C. are less water soluble and have a mole ratio of 1 $Li_2O$:2 $SiO_2$ and 2.2 $H_2O$. A permanent residual film is formed relatively quickly on heating to 95° C. but is formed more slowly at 60° C. A disilicate solution containing 2.5% of $SiO_2$ left no permanent finish on glass when exposed to a 95° C. oil bath for an hour, but when heated for 24 hours there was a densely fogged uniform finish.

Example 11

The presence of other additaments does not prevent the film development in lithium silicate solutions. A mixture of 50% $Li_2O$:2 $SiO_2$ solution with 12.5% $SiO_2$ and 50% $Na_2O$:2 $SiO_2$ solution with 12.5% $SiO_2$ was put in a test tube containing a flint glass rod and heated to 95° C. for 16 hours without evaporation. The finish on the rod was equivalent to that obtained with the lithium silicate alone whereas no apparent finish developed with the sodium disilicate solution containing no lithium silicate.

Similarly, when a quaternary ammonium silicate solution with 12.5% $SiO_2$ was used instead of the sodium disilicate, a similar finish developed only when lithium silicate was present.

UTILITY

The surface treatments are useful in a wide variety of areas. They reduce light reflection without reducing or indeed while increasing the transmittance of glass. They may be so thick as to make the glass opaque or merely to flatten the glossiness. Surface porosity may be reduced or even sealed; and corrosion or tarnish resistance and the scratch resistance of metals may be increased. Adhesives and decorative films may be more strongly bonded to such surface. Slip resistance and printability may be increased, and the surfaces may be used for chromotagraphic development. Low reflective coatings on glass are useful in treating automobile windshields and head lights. Plate glass and flat glass for windows and picture frames may also be made non-reflective. Television screens and lenses and other optical equipment may also be treated by these processes to reduce reflection and increase transmission. Non-conductive films for electrical applications are possible, either or glass or on metal etc. as desired. Fiberglass may be delustered and its resistance to raveling may be increased by mechanical interlocking. Stronger resin attachment to the fiber matrix may be developed for the manufacture of glass fiber reinforced plastics. Color affinity to the glass surface is also increased. Lithium silicates at higher ratio may be used to avoid alkali damage to glass fibers.

Thus I have found that lithium silicate solutions alone of the alkali metal silicate solutions form in a restricted range of concentration, ratio, and temperature, a siliceous film on wetted or hydrated surfaces without the drying step usually required.

More or less detailed claims will be presented hereinafter and even though such claims are rather specific in nature those skilled in the art to which this invention pertains will recognize that there are obvious equivalents for the specific materials recited therein. Some of these obvious equivalents are disclosed herein, other obvious equivalents will immediately occur to one skilled in the art, and still other obvious equivalents could be readily ascertained upon rather simple, routine, non-inventive experimentation. Certainly no invention would be involved in substituting one or more of such obvious equivalents for the materials specifically recited in the claims. It is intended that all such obvious equivalents be encompassed within the scope of this invention and patent grant in accordance with the well known doctrine of equivalents, as well as changed proportions of the ingredients which do not render the composition unsuitable for the disclosed purposes. Therefore, this application for Letters Patent is intended to cover all such modifications, changes and substitutions as would reasonably fall within the scope of the appended claims.

What I claim is:

1. A process for providing substrates having a hydroxylated surface with a siliceous film which consists essentially of:
    (a) wetting the hydroxylated surface, which is maintained at a temperature above about 60° C., with a solution consisting essentially of water and lithium silicate having a $SiO_2$:$Li_2O$ mol ratio within the range of about 1.3:1 to about 10.7:1 and a concentration of about 1 to 30% by weight of $SiO_2$; and
    (b) continuing contact between the hydroxylated surface and the aqueous solution without significant change in concentration of the solution, and maintaining the temperature above about 60° C., until a siliceous finish of the desired thickness is formed on the surface of the substrate,
    (c) thereafter removing the majority of the aqueous solution that was originally brought in contact with said hydroxylated surface,
    (d) washing the substrate to remove residual lithium silicate solution, and
    (e) recovering a substrate having a siliceous finish that cannot be removed by ordinary washing and scrubbing.

2. A process according to claim 1 wherein said $SiO_2$:$Li_2O$ ratio is between 1.5:1 and 2.5 to 1.

3. A process according to claim 1 wherein said $SiO_2$:$Li_2O$ ratio is about 2:1.

4. The process of claim 1 wherein said substrate is selected from the group consisting of siliceous glass, porcelain, metals, rubber, synthetic resins and cellulosic surfaces.

5. The process of claim 2 wherein said substrate is selected from the group consisting of siliceous glass, porcelain, metals, rubber, synthetic resins, and cellulosic surfaces.

6. The process of claim 3 wherein said substrate is selected from the group consisting of siliceous glass, porcelain, metals, rubber, synthetic resins, and cellulosic surfaces.

7. The process of claim 1 wherein said substrate is a siliceous composition.

8. The process of claim 2 wherein said substrate is a siliceous composition.

9. The process of claim 3 wherein said substrate is a siliceous composition.

10. The process of claim 1 wherein said substrate is an oxidizable metal.

11. The process of claim 2 wherein said substrate is an oxidizable metal.

12. The process of claim 3 wherein said substrate is an oxidizable metal.

References Cited

UNITED STATES PATENTS

| | | | |
|---|---|---|---|
| 3,180,747 | 4/1965 | Patton et al. | 117—169X |
| 3,301,701 | 1/1967 | Baker et al. | 117—124X |

ALFRED L. LEAVITT, Primary Examiner

W. F. CYRON, Assistant Examiner

U.S. Cl. X.R.

117—124, 135.1, 138.8, 139, 143, 169